United States Patent [19]

Brewer

[11] Patent Number: 5,856,278
[45] Date of Patent: Jan. 5, 1999

[54] FRICTION MATERIAL FOR USE WITH AL. ALLOY ROTOR

[75] Inventor: Anthony J. Brewer, Stockport, England

[73] Assignee: Ferodo Limited, Manchester, England

[21] Appl. No.: 656,298

[22] PCT Filed: Jan. 18, 1995

[86] PCT No.: PCT/GB95/00084

§ 371 Date: Jun. 17, 1996

§ 102(e) Date: Jun. 17, 1996

[87] PCT Pub. No.: WO95/20110

PCT Pub. Date: Jul. 27, 1995

[30] Foreign Application Priority Data

Jan. 21, 1994 [GB] United Kingdom ............... 9401137.6

[51] Int. Cl.$^6$ ........................................... F16D 69/02
[52] U.S. Cl. ........................ 508/105; 508/108; 508/156
[58] Field of Search ..................................... 508/105, 108, 508/156

[56] References Cited

FOREIGN PATENT DOCUMENTS

0270089 A2  6/1988  European Pat. Off. .

OTHER PUBLICATIONS

WPI Abstract Accession No. 94–062221/08 & JP 6017031 A (AISHIN) 25 Jan. 1994.

WPI Abstract Accession No. 87–352176/50 & JP 62255632 A (TOYOTA) 7 Nov. 1987.

*Primary Examiner*—Nathan M. Nutter
*Attorney, Agent, or Firm*—Nixon & Vanderhye P.C.

[57] ABSTRACT

A friction material especially for use in conjunction with aluminum alloy brake rotors containing silicon carbide particles contains 15 to 80% of a finely divided alumina abrasive, from 5 to 40% of cured organic binder, less than 5% metal in particulate form and less than 5% particulate carbon and/or graphite, from 1 to 40% of organic fiber the balance being particulate inert filler and optionally, a non-graphitic lubricant, all percentages being by volume.

7 Claims, No Drawings

FRICTION MATERIAL FOR USE WITH AL. ALLOY ROTOR

CONTINUING DATA

This application is a continuation filed under 35USC 371 of PCT/GB95/00084, filed 18 Jan. 1995.

This invention relates to friction materials and in particular to friction materials for use in disk brake pads.

Traditional, conventional disk brake pads are formulated for use with cast iron brake rotors. They normally consist of a mixture of ingredients, typically resin and/or rubber binders, abrasives, lubricants and inorganic/metallic fillers, often in conjunction with a fibrous reinforcement. Compositions may vary widely, but the objective is to develop a reasonably stable coefficient of friction under operational conditions.

More recently it has been proposed to use aluminium alloys as brake rotor material. In particular, aluminium alloy containing silicon carbide particles has been proposed. Such alloys are very different in behaviour to cast iron, because they are extremely hard. Although they may appear superficially quite smooth, they are also very abrasive due to the presence of substantial amounts of silicon carbide.

The use of conventional friction material formulations with such aluminium alloy brake rotors has been generally unsuccessful, for at least two reasons. Firstly, the abrasives in a conventional pad formulation tend to plough through the relatively soft aluminium component of the rotor, scoring it. Secondly, the rate of pad wear is unacceptably high. Arising from both of these, the frictional performance is not acceptable.

It has now been found that a considerably better performance can be achieved on an aluminium alloy rotor by, in effect, abandoning conventional friction material formulation techniques.

According to the present invention, a friction material comprises (a) from 5 to 80% by volume of a finely divided abrasive, (b) from 5 to 40% of volume of a cured organic binder, (c) less than 5% by volume of metal in particulate form and less than 5% by volume of particulate carbon and/or graphite, (d) from 1 to 40% by volume of organic fibre and (e) the balance being particulate inert filler and optionally, a non-graphitic lubricant.

The finely divided abrasive is preferably of particle size 1–10 microns, alumina being particularly preferred.

The organic binder may be a resin/rubber mixture, phenolic resin and nitrile rubber being especially preferred.

The inert filler may be any of the materials conventionally employed for this purpose, for example, vermiculite, barium sulphate or mica, or mixtures of these. The use of a non-graphitic lubricant such as chalcopyrites or metal sulphides, hydrocarbon waxes and soaps may be beneficial in controlling the coefficient of friction.

The organic fibre is preferably selected from acrylic or aromatic polyamide (aramid) fibres, or blends of these. It may also be a cellulosic fibre, optionally blended with other organic fibre.

Despite the absence of significant amounts of the materials which are normally present, such as metal particles, glass/metal fibres and in particular graphite and/or carbon black, the friction materials of this invention exhibit superior behaviour in use with aluminium alloy brake rotors.

After a very short bedding-in period, the initially high coefficient of friction drops rapidly to a lower figure, typically about 0.35 and exhibits good stability under operational conditions of varying temperature, speed and time.

In order that the invention be better understood, two particularly preferred embodiments of it will now be described with reference to the following Examples.

EXAMPLE 1

A friction material was compounded from the following, expressed in percent by volume.

| | |
|---|---|
| Phenolic resin | 10 |
| NBR rubber (solvated) | 15 |
| NBR rubber (crumb) | 10 |
| Alumina (1–10 micron particles) | 15 |
| Chalcopyrites | 10 |
| Barium sulphate | 15 |
| Vermiculite | 10 |
| Mica | 10 |
| Acrylic fibres | 5 |

The composition was press moulded into disk brake pads and the rubber/resin binder was thereafter cured, to produce a final product. On testing in a conventional dynamometer rig fitted with an aluminium alloy rotor, the behaviour of the pads was excellent, despite the highly abrasive aggressive nature of the silicon carbide toughened rotor. Pad wear was good; the coefficient of friction was stable at about 0.35, a satisfactory value.

EXAMPLE 2

A friction material was compounded from the following, expressed in percent by volume.

| | |
|---|---|
| Phenolic resin | 10 |
| NBR rubber (solvated) | 15 |
| NBR rubber (crumb) | 5 |
| Alumina (1–10 micron particles) | 40 |
| Chalcopyrites | 10 |
| Barium sulphate | 10 |
| Acrylic fibres | 5 |
| Cashew friction particle | 5 |

The composition was processed into disk brake pads, as before and subjected to dynamometer testing using an aluminium alloy brake rotor.

Surprisingly, it was found that the substantially greater content of abrasive gave equally good results, together with an acceptable, stable coefficient of friction.

EXAMPLE 3

A friction material was compounded from the following, expressed in percent by volume.

| | |
|---|---|
| Phenolic resin | 10 |
| NBR rubber (solvated) | 15 |
| NBR rubber (crumb) | 5 |
| Alumina (1–10 micron particles) | 20 |
| Chalcopyrites | 10 |
| Barium sulphate | 10 |
| Aramid fibre pulp | 25 |
| Cashew friction particles | 5 |

The composition was processed into disk brake pads, and tested as before. The performance was good.

I claim:

1. A friction material consisting essentially of:
   (a) 15 to 80% by volume of finely divided abrasive alumina having a majority of particles in the range 1–10 microns,
   (b) 5 to 40% by volume of organic binder,
   (c) 1–40% by volume organic fiber,
the balance being particulate non-metallic inert filler and optionally, non-graphitic lubricant.

2. A friction material according to claim 1 wherein the organic binder is a rubber/resin mixture.

3. A friction material according to claim 1 wherein the binder is a phenolic resin/nitrile rubber mixture.

4. A friction material according to claim 1 wherein the inert filler is vermiculite, barium sulphate, mica, or including mixtures of these.

5. A friction material according to claim 1 wherein the organic fibre is polyacrylonitrile fibre, aromatic polyamide fibre or cellulosic fibre, or blends of these.

6. A friction material according to claim 1 containing non-graphitic lubricant selected from chalcopyrites, metal sulphides, hydrocarbon waxes and soaps, or mixtures thereof.

7. A friction material for use in conjunction with aluminum alloy brake rotors containing silicon carbide particles, the friction material comprising:
   (a) 15 to 80% by volume of finely divided abrasive alumina having a majority of particles in the range 1–10 microns,
   (b) 5 to 40% by volume of cured organic binder,
   (c) 1–40% by volume organic fiber,
the balance being particulate non-metallic inert filler and optionally, a non-graphitic lubricant.

* * * * *